3,046,243
AQUEOUS GLASS-FIBER SIZING COMPOSITION CONTAINING POLYMER AND CATIONIC DE-IONIZATION PRODUCT OF A VINYL SILICONATE
Thomas R. Santelli, Toledo, and John G. Mohr, Woodville, Ohio, and Calvin A. Calendine, Parkersburg, W. Va., assignors, by mesne assignments, to Johns-Manville Fiber Glass Inc., Cleveland, Ohio, a corporation of Delaware
No Drawing. Continuation of application Ser. No. 344,454, Mar. 24, 1953. This application Feb. 5, 1958, Ser. No. 713,317
7 Claims. (Cl. 260—29.6)

The present invention relates broadly to the art of coating compositions and more particularly to a new and improved sizing or coating for heat softenable materials which may be applied during the formation thereof and which imparts superior lubricative properties thereto and substantially improves the adhesion of synthetic resins to said materials.

This application is a continuation of our copending application Serial No. 344,454, filed March 24, 1953, now abandoned.

Recently there has been shown considerable interest in the use of certain organo-silicon compounds as surface active agents in the treatment of fibrous glass materials prior to their incorporation in a resinous laminate. It has been found that the bonding strength between the glass and resin may be substantially increased by the application of these compounds to glass cloth and that laminates produced therefrom are essentially unaffected by exposure to moisture. One explanation for the presence of this particularly strong bond is that the silicon portion of the organo-silicon compound reacts with and becomes a part of the glass surface and the double bond in the organic radical of the coating compounds tends to react with the plastic or resin to form a strong chemical union between these two materials.

Generally speaking, laminates using fibrous glass cloth have been prepared by weaving fibrous glass yarns into a fabric. The glass cloth is preferably first cleaned by heating or washing to remove such organic materials as may be present prior to weaving, thus leaving the surface of the fibrous material in a condition to readily react with the organo-silicon coating material which is then applied to the heat-cleaned or washed glass by any suitable method such as spraying or dipping. The coating thus applied to the fabricated fibers is termed a "finish," as distinguished from a "size" which is applied to the fibrous material during formation thereof.

The treated glass cloth is, by one or more processes, washed to remove undesirable substances, then impregnated with a plastic or resin and built up in layers to the desired thickness and subjected to heat and pressure to produce the final laminated composition.

Now, while glass cloth-resin laminates produced as described above have gained wide acceptance in the art, it is apparent that the direct application of the organo-silicones to the glass fibers as they are drawn from the bushing has substantial advantages, primarily in the elimination of the relatively costly steps of heat-cleaning prior to or washing after the coating operation. Not only are these steps expensive, but they have a tendency to weaken the cloth, thereby reducing the flexural strength values which may be attained for laminates made of said cloth. Further advantages result from surface treatment of the fiber in its freshly formed state since while in this state the fiber has its highest strength and its most reactive surface. By immediately protecting the fiber surface with a size, most of the original fiber strength is maintained, and in addition, a better bond between said surface and the organo-silicones results by reason of the reactiveness of the fibrous surface.

However, since any sizing material which is to be applied to glass fibers during the formation thereof must possess certain characteristics and produce certain desirable results, and these characteristics and results are not entirely provided by the organo-silicon compounds by themselves, it logically follows that a number of problems exist in the direct application of these compounds to newly formed fibers which are not present in the after-treatment of glass cloth. First, since a bundle of glass filaments are conventionally drawn from a hot bushing at speeds in the neighborhood to 5000 to 10,000 feet per minute and are grouped into a single strand at this same speed, it is necessary that a liquid sizing be applied to the filaments which will bind them together into a composite body and maintain them in this condition during subsequent twisting, plying, winding, weaving, or further processing operations. The binder or film forming agent must thus impart strand integrity to the fibers. However, it is also essential that the binder be compatible with the resin employed in the formation of glass fiber-resin laminates, should adhere well to the resin even in the presence of moisture, and must have no deleterious effect upon the organo-silicon compound with which it is combined.

Second, the size must also possess as one of its ingredients a lubricating material which functions to coat the individual filaments and protect them against mutual abrasion during the winding, twisting, plying and weaving procedures common to the art. This is particularly important since, should some of the individual filaments be fractured as the strand passes through the guide eyes of the processing equipment, a noticeable fuzzing of the strand occurs which renders the strand unacceptable to the consumer and suitable for little other than scrap usage. And yet at the same time that the lubricant permits relative movement of the fibers in the strand and thereby prevents breakage due to abrasion, it also should not have an adverse effect on the stability of the organo-silicon or impair the function of the silicon in forming a strong chemical bond with the laminating resin. In addition, the lubricant should not inhibit the adhesive properties of the binder or film forming agent in the sizing composition.

Third, it is also desirable that the sizing composition contain, either separately or as a part of the lubricant content, an emulsion polymer or stabilizer for the purpose of wetting the surface of the glass and thereby rendering it amenable to the action of the binder. However, such stabilizers should dry to a clear transparent film and should not only be soluble in the uncured laminating resin, but should be compatible with the cured resin. In addition, the emulsifier content must be held to a minimum in order to prevent a weakening of the action of the organo-silicon on the glass surface.

It is therefore an important aim of the present invention to provide a coating which may be readily applied to the glass fibers during the attenuation thereof, and which adequately binds the individual filaments into a single strand, lubricates said filaments and thereby prevents mutual abrasion, and modifies the surface characteristics of the glass fibers to improve the adhesion thereto of resinous materials.

It is another object of this invention to provide a sizing composition for application to glass fibers at the bushing which need not be removed from said fibers prior to their weaving into glass cloth, and which imparts to the glass fiber strands the desired integrity, lubricity, pliability and abrasion resistance.

Another object of the invention lies in the provision of a sizing composition which may be uniformly applied to the surfaces of the glass fibers during the high speed drawing thereof, and which is an essentially stable water dispersion characterized by its failure to liberate or produce undesirable gaseous, liquid or solid residues during or after the application to the semi-molten filaments.

Still another object of the invention is to provde a glass fiber size of the above character which is of universal application to the fibers regardless of their ultimate use, and which has increased stability while in solution form and also while carried on said fibers.

A further object of the invention is to provide a novel coating or sizing composition for glass fibers comprising a film forming agent, lubricant, and organo-silicone, each of which is compatible with the other and all of which are compatible with laminating resins, varnishes and the like.

A still further object of the invention is in the provision of glass fibers coated with a size comprising the product of heat curing a sizing composition of the character described, which fibers have superior running properties in production, and when a part of a plastic laminate, produce a wet strength retention substantially greater than that provided by many compositions now used for a similar purpose.

More specific objects and advantages will become apparent as the description proceeds.

One generally satisfactory method of producing glass fiber threads or strands consists in flowing a plurality of streams of molten glass from a bushing or feeder and then attenuating said streams into fine fibers by a rotating drum onto which the fibers are wound. The fibers made by this process are of relatively great length and are commonly referred to in the art as continuous fibers.

In this process, which is described in the Slayter and Thomas Patent No. 2,234,986, the fibers are collected in strand form by passing the same over a pad or guide which is interposed in spaced relation to the bushing and attenuating drum. This guide or pad conventionally performs the additional function of applying a lubricant and/or binder to the individual filaments, and a pad of this character may be employed to apply the sizing composition herein disclosed to said filaments. Or if desired, the present composition may be flowed onto the fibers by contact with a rotatable roller partially immersed in a container carrying said composition.

The novel glass fiber coating of this invention is also of application to fibers formed by methods other than the continuous forming process above described. Thus, what are known to the trade as staple fibers are produced by engaging the streams of molten material with a gaseous blast from a blower and attenuating them into fibers. In accordance with this method, an organic lubricant is sprayed onto the fibers at a point below the blower. However, it is within the contemplation of this invention that the present sizing composition is an advantageous substitute for such a lubricant, and that staple fibers carrying this size are of important application in molded synthetic resinous products as well as in other products.

Regardless, however, of the particular process which is employed in the production of the glass fibers, there is accomplished superior pliability and lubricity, improved binding action and more effective modification of the surface characteristics of the glass by providing on the glass filaments during the attenuation thereof a coating comprising a stable aqueous vinyl silanol solution or dispersion prepared by contacting a vinyl siliconate with a hydrogen form of a cation exchanger, an aqueous dispersion of a resinous film-forming agent, and a water-dispersible lubricant of a specified class, the pH of the coating composition being preferably not more than 8.

More specifically, the vinyl silanol utilized in the sizing composition is that of the type prepared according to the method described in the copending application of Thomas R. Santelli, Serial 279,470, filed March 29, 1952, and assigned to the assignee of the present application, now abandoned. As disclosed therein, a deionized aqueous vinyl silanol dispersion or solution of superior stability and reactivity with glass is produced by the cationic deionization only of a water-soluble vinyl siliconate of a metal of the class consisting of alkali metals and alkaline earth metals by contact with the hydrogen form of a cation exchanger. By this process the metal cations are removed from the siliconate with the production in one step of a stable vinyl silanol free of salt-forming metal cations. The resulting aqueous dispersion or solution of silanol has a pH in the range between 3 and 7, in which condition it is sufficiently stable to permit its incorporation and use in a sizing composition. The vinyl silanol in a stable aqueous silanol dispersion produced by this method has an average unit structure corresponding to the formula

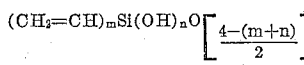

wherein $m$ is a number from .05 to 3 and $n$ is a number from 1 to 3.95.

A silanol of the type useful in this invention is preferably derived by the method of the Santelli application from an alkali metal or alkaline earth metal siliconate. The siliconate in turn is derived by hydrolysis and neutralization of a hydrolyzable silane composition comprising a major proportion of a trifunctional vinyl silane, i.e. a mono-vinyl silane in which the remaining valences are attached to hydrolyzable groups. Other silanes may be present in minor proportions, and preferably in proportions less than 25% by weight of the hydrolyzable silane composition. Such other silanes may include other unsaturated silanes such as allyl silanes, saturated alkyl, aryl, and cycloaliphatic silanes, and any of these and other silanes having differing degrees of functionality such as saturated and unsaturated difunctional and monofunctional silanes such as diphenyl diethoxy-silane, diphenyl dichlorosilane, divinyl dichlorosilane, diallyl diethoxysilane, diethyl diethoxysilane, trimethylsilane and others, and hydrolyzable tetrafunctional silanes such as ethyl orthosilicate, silicon tetrachloride, and others. It is preferred to use pure mono-vinyl trifunctional silanes such as vinyl tritchloro-, tribromo- or trialkoxy silanes.

For the purposes of this invention, however, regardless of the particular silanes in the mixture, the hydrolyzable mixture should have an r/Si ratio between 0.8 and 1.50, and more specifically, between 0.95 and 1.25, in order to obtain a silanol having sufficient affinity for both the glass and the laminating plastic, and which also is dispersable in an aqueous system. In actual production, the use of substantially pure trifunctional silanes, i.e. those having an r/Si ratio of about 1.0, has provided particularly satisfactory results. The "r/Si ratio" means the ratio of the total number of non-hydrolyzable groups to the total number of silicon atoms in the hydrolyzable mixture, i.e., "r" is the total number of non-hydrolyzable groups attached to silicon atoms in the organo-silicon material and Si is the total number of silicon atoms therein.

HYDROLYZABLE COMPOSITION

The mono-vinyl trifunctional silanes, which comprise the major ingredient of the hydrolyzable silane mixture, include vinyl trichlorosilane, vinyl tribromosilane, vinyl triethoxysilane, vinyl tripropoxy silane, vinyl tributoxy silane, vinyl mono-chloro diethoxy-silane, vinyl triphenoxysilane, vinyl triacetoxysilane, vinyl triaminosilane, and others. The vinyl chlorosilanes are preferred because of their relatively low cost and ease of hydrolysis in water or aqueous acid solution, while the vinyl alkoxy silanes are preferred because of their ease of hydrolysis in alkaline aqueous solution with the direct formation of a usable siliconate and an easily recoverable volatile alcohol.

Other silanes which may be utilized include aliphatic trifunctional silanes such as methyl trichlorosilane, ethyl trichlorosilane, butyl trichlorosilane, hexyl trichlorosilane, methyl triethoxysilane, ethyl triethoxysilane, butyl tributoxysilane, and others; trifunctional aromatic silanes such as phenyl trichlorosilane, phenyl triethoxysilane, phenyl mono-chloro diethoxy silane and others; aliphatic and aromatic difunctional silanes such as dimethyl dichlorosilane, diethyl dichlorosilane, dimethyl diethoxysilane, dimethyl monochloro silane, diphenyl dichlorosilane, diphenyl diethoxysilane, monophenyl dichlorosilane, monophenyl diethoxysilane, and others; unsaturated silanes such as allyl triethoxysilane, methallyl triethoxysilane, methyl vinyl dichlorosilane, ethylvinyl diethoxysilane, and others; and other silanes containing hydrolyzable amino, acetoxy, and aroxy groups. For the purposes of this invention, a hydrogen atom attached to silicon is considered to be a hydrolyzable group because on treatment with a caustic or base to form the siliconate, the hydrogen atom is liberated. This monophenyl dichlorosilane is believed to be equivalent to phenyl trichlorosilane in the formation of siliconates.

SILICONATE SOLUTION

The basic siliconate solution can be made in a number of ways, depending to some degree on the silane starting material. Both the chlorosilanes and alkoxy silanes may first be hydrolyzed in water or aqueous acid to obtain a caustic soluble silanol or siloxanol (an undehydrated form of siloxane) which is then mixed with or dissolved in an aqueous caustic or base to obtain a concentrated siliconate solution free of chloride or other anions. Alkoxy silanes, on the other hand, may be hydrolyzed in aqueous caustic, alkali metal or alkaline earth metal hydroxide to obtain directly an alcoholic aqueous siliconate solution from which the alcohol may be removed, if desired, by simple distillation. Either method results in a siliconate solution usable in the invention. The amino-, acetoxy- and aroxy-silanes are similarly hydrolyzed in water, aqueous acid or aqueous alkali by either of these two general methods with but minor variations in technique, all of which are well understood in the art. Solvents may be utilized, if desired.

In the preparation of the vinyl siliconate, sufficient of an alkali metal base or alkaline earth metal base is utilized to produce a water-soluble siliconate. Usually about one mol of the base per mol of the organosilane, i.e. sufficient to produce a mono-metal salt, is preferred. However, with silane compositions in which the $r/Si$ ratio is higher than 1.0, or with highly condensed silanols or siloxanols, the formation of a di-metal or higher salt may be necessary to obtain a siliconate that is water soluble. In any of these a slight excess of the base over theoretical proportions, for example, 10 to 20% molar excess, is preferred to insure complete solubility. Although it is not known with certainty, it is believed that the di-metal and higher salts produce silanols, which on treatment with a cation exchange agent, have a higher proportion of monomer or low molecular weight silanol than the siliconate salts of lower order. If promptly applied to glass or other reactive surfaces, a silanol of higher monomer content will exhibit greater affinity for said surface and produce a tightly adherent coating thereon. As used herein, the term "siliconate" includes the water-soluble salts of siliconic-type acids irrespective of the number of organo groups attached to each silicon atom.

The siliconate content of solutions made by any of the described or other methods may vary considerably. Vinyl triethoxysilane, for example, can be hydrolyzed directly in aqueous caustic, and the alcohol by-product of hydrolysis removed by distillation, if desired, to produce a stable aqueous siliconate solution containing from 0.1 to 55% or more siliconate solids. At the time that the siliconate solution is treated with a cation exchange agent it is preferred to dilute the siliconate solution to less than 10% concentration and preferably to 5% or less for the reason that dilute solutions are most efficiently handled in conventional ion-exchange equipment. This is no disadvantage in the production of the sizing composition of this invention, however, since the silanol content of the latter is usually of the same order. Before mixing with the other size ingredients it may be desirable to further dilute the ion-exchanged silanol solution or dispersion.

As described in the noted Santelli application, the siliconate itself may be made by mixing, for example, vinyl triethoxysilane (190 grams) in a flask with water (168 grams) containing sodium hydroxide (40 grams) and ethanol (100 cc.) and distilling the resulting mixture until 190 grams of 90% ethanol have been recovered. Sixty grams of the vinyl siliconate thus prepared may then be diluted to comprise about 98% water, and drawn with suction through a glass tube approximately two and one-half inches in diameter and thirty inches in length that is one-half filled with a cationic exchanger, as for example, the hydrogen form of a sulfonic acid cation exchanger such as the sulfonated coals.

The film forming ingredient should, as noted above, be capable of air drying to a continuous film and be readily dissolved in the laminating resin, such as a polyester. It is also considered necessary that the film forming agent be a stable water emulsion of the cationic character and be stable through a pH range of 2 to 8. Although certain thermosetting resins are suitable, the thermoplastic resin polymer emulsions are more desirable, and particularly, such materials as those synthetic resinous film-forming agents formed from ethylenically unsaturated monomers, such as, polybutyl methacrylate, polystyrene, styrene-butadiene copolymer, polyvinyl pyridine, polyvinyl butyral, and polyvinyl acetate. Experience has indicated the latter resin imparts the more desired binding qualities to the filaments and particularly useful formulations are known to the trade as Du Pont's Elvacet 81–900 and Swift's 1482–FG Adhesive.

The lubricating ingredient of the present sizing composition performs a number of functions, for example, it lubricates each filament so as to permit movement thereof relative to other filaments in a strand and also relative movement between adjacent strands during plying, twisting, and weaving; the lubricant also regulates the softness and pliability or "feel" or "hand" of the strands; and the lubricant also may act as an emulsion stabilizer, wetting agent, surface-active agent or antistatic agent for modifying the surface characteristics of the glass fibers.

Experience has indicated that each of the foregoing characteristics may singly or together be imparted to the fibers by incorporating in the size a lubricant of the type used in the textile industry for the above purposes and comprising one or more nonionic or cation types. Typical of the lubricants which have been successfuly incorporated in the above-described sizing compositions are amides of monobasic and dibasic fatty acids, solublized with low molecular weight acids, and ester type plasticizers. It has also been found that the selection of a particular lubricant depends on the use to be made of the sized glass fibers. For example, if the fiber is to be used as continuous length roving, without substantial twisting or without weaving, strand integrity is not of paramount importance, but since modification of the surface characteristics is relatively more so, one of the cationic amide type lubricants would be chosen. If the fibers are to be plied, twisted, or woven strand integrity is of highest importance so that a lubricant or combination of lubricants is chosen which produces the desired softness, pliability, and other characteristics necessary to withstand these operations. In the latter case a mixture of the fatty acid amide type and plasticizer type has been found most suitable. By the use of one or more of these lubricant materials in various proportions a sizing composition can be derived for any particular usage.

To illustrate, for continuous length roving fiber from 0.01 to 0.50% (on the total weight of sizing composition) of either a fatty acid amide type, such as the tetraethylene pentamine amide of pelargonic acid, solubilized with acetic acid or an ester type plasticizer such as dibutyl phthalate will produce roving varying from very hard to very soft. For weaving, on the other hand, a mixture of from 0.01 to 0.50% of the same amide type lubricant and from 0.05 to 0.75% of an ester type plasticizer such as dibutyl phthalate produces a glass strand of a softness adapted to a wide variety of weaving operations.

The lubricants of the fatty acid amide types are preferably of the cationic type and may be an amide of a dibasic or monobasic acid and a polyethylene polyamine that have been solubilized with low molecular weight acids such as acrylic, methacrylic and acetic acids. One such amide-type lubricant, which has good surface modifying or wetting properties and which has been proven quite successful, is a product designated as RL–185a which is identified as an amide of pelargonic acid and tetraethylene pentamine solublized with acetic acid. Other suitable lubricants are amides of stearic acid or caproic acid reacted with polyethylene polyamines such as tetraethylene pentamine, and solublized with low molecular weight acids such as acetic acid.

Ester and polyester type plasticizers have the further characteristics of providing lubrication in the uncatalyzed state, and are desirably not only compatible with the film-forming agent, but also are stable alone and in admixture with said film-forming agent. In addition, these lubricants also should have no adverse effect on the stability of the vinyl silanol and its ability to form a strong chemical bond with the laminating resin. Further the lubricant preferably should be non-tacky, nonionic or cationic in nature in order to eliminate fuzzing of the glass fibers during processing, and be moderately soluble or easily dispersible in water emulsions of polyvinyl acetate or equivalents therefor. Suitable materials of these types include diallyl phthalate, ethylene glycol dimethacrylate, liquid polymerizable polyhydric alcohol-polycarboxylic acid polyesters, diamyl phthalate, dibutyl phthalate, dicarbitol phthalate, dibutoxyglycol phthalate, dimethoxyglycol phthalate, butyl phthalyl butyl glycolate, methyl phthalyl ethyl glycolate, triglycol di-2-ethylbutyrate, triglycol di-2-ethylhexoate, tricresyl phosphate, triphenyl phosphate, a material designated as Pluronic F–68 which is understood to be a product prepared by condensing ethylene oxide with a hydrophobic base formed by the condensation of propylene oxide with propylene glycol, a chemical designated as Kapsol which is understood to be methoxyethyloleate, and compounds known as Plastolein 9715 and Plastolein 9720 which are understood to be primarily composed of esters and polyesters of azelaic and pelargonic acids. Of the above materials it has been found that dibutyl phthalate, tricresyl phosphate and Pluronic F–68 are particularly suitable.

By way of illustration and not limitation, it may be stated that applicants' sizing or coating composition may be prepared in the following manner. The various components of the size are measured or weighed in amounts sufficient to produce in the final composition of the size from 0.50 to 7% and preferably 0.5 to 5%, by weight of a film-forming agent such as polyvinyl acetate, from 0.05 to 5%, and preferably 0.10 to 1%, of a vinylsilanol as prepared by the ion-exchange method of the above-mentioned Santelli application, from 0.01 to 1.20%, more preferably 0.025 to 1%, by weight of lubricant, and water sufficient to bring the total to 100%. Relative to the total content of film-forming agent, the total lubricant content can constitute up to 50% by weight, although with dibutyl phthalate, RL–185a, and other very efficient lubricants or softeners it is preferred to utilize less than 30% thereof. However, when utilizing as the lubricant a material such as the above-noted Kapsol or other similar suitable compounds, it is preferred that the percentage by weight of lubricant be increased to 1.6%, or 50% by weight of the solids content of polyvinyl acetate emulsion. It is even more preferred that the total lubricant content be less than 1% by weight of the total sizing composition. The total solids content of the sizing composition can vary from as little as 1.0% to as much as 10% providing the sizing composition is maintained at a viscosity conducive to the intended mode of application to the fibers.

Subsequent to the measuring of the above materials, one-third of the required amount of water is placed in a mixing tank and an agitator placed therein, started and allowed to run continuously. The required amount of dibutyl phthalate or other lubricant is then added to the measured portion of polyvinyl acetate with stirring and the mixture resulting therefrom added to the water in the mixing tank and agitation continued. In a separate container the RL–185a, if also employed, is diluted with five times its weight of water, agitated and then poured into the mixing tank containing the binder, other lubricant and water. Thereafter the measured amount of silicone, as prepared in the manner disclosed in the above Santelli application, is also added to the mixing tank followed by the remainder (roughly ⅔) of the water. The agitation is continued for approximately ten minutes, whereupon the sizing solution is ready for use in either a pad or roller applicator of other suitable device. Should it be desired to employ tricresyl phosphate or Pluronic F–68 as the lubricant, substantially the same percentage may be used, while with certain of the other lubricants suggested, suitable percentage adjustments may be made to produce optimum results.

Glass fibers coated with the above compositions or with others containing either dibutyl phthalate, tricresyl phosphate or Pluronic F–68 are then subjected to a heat curing, the length of said curing depending generally on the ultimate use of the fibrous material. Should it be desired to use the fibers in electrical applications, wherein it is considered the silicone component will aid in the stability of the varnish or lacquer or other coating, the sized fibrous thread or yarn is preferably heated at 210° F. for three to four hours, depending upon the fiber diameter, to set the film and drive off a large part of the lubricant. However, when it is contemplated that the glass fibers will be employed in roving form for plastic reinforcements, it is desirable that the heat curing be lengthened to roughly between six and eight hours at approximately the same temperature so as to evaporate a major portion of the lubricant and leave on the roving approximately 0.04% by weight of the lubricant, such as for example, dibutyl phthalate or tricresyl phosphate or Pluronic F–68. The reason for this is that roving, which comprises a plurality of slight twisted strands made up of generally parallel filaments, is normally chopped into relatively short lengths of about two inches and said lengths thereafter deposited on a matrix in the formation of the ultimate plastic article. It has been found that the strands will open up to the desired degree during chopping and that the free fall and distribution of the fibers is facilitated by a lesser amount of lubricant thereon at the time of chopping, although a relatively greater amount is considered necessary to avoid filament breakage and drag during the twisting operations preparatory to making the roving. Also, roving is finding use in a continuous filament form as a reinforcement material in articles such as fishing rods. In order to provide the desired handleability characteristics when so employed, it has been found desirable to drive off the greater part of the lubricant to leave approximately 0.04% by weight thereof on the roving. Glass fibers coated with the present size which are to be twisted, plied or wound, and subsequently used for weaving into glass cloth, and thereafter employed to reinforce plastics, are desirably heat cured in the same manner as for electrical applications.

Example 1

A sizing formulation has been made as described above using materials and proportions as follows:

Material: Percent/wt.
- Vinyl silanol _____ 0.25
- RL-185a [1] _____ 0.04
- Polyvinyl acetate [2] _____ 0.55
- Dibutyl phthalate _____ 0.52

[1] Tetraethylene pentamine amide of pelargonic acid, solubilized with acetic acid.
[2] Elvacet—an aqueous emulsion containing about 50% solids.

The above mix was applied at the bushing by pad applicator to fibers which were thereafter wound up on cones into a 225⅓ yarn and dried for 3 hours in an oven maintained at 210° F. Material efficiency in the forming room was 85% or better. The fibers were then twisted, plied and coned with 100% efficiency, very few break-outs being experienced during twisting and a minimum of fuzzing during plying and coning. The yarn was then woven on standard glass cloth looms to produce a cloth, in everywise equivalent in appearance to and nearly twice as strong as silicone-finished cloth woven from ordinary starch-oil sized fiber and then heat-cleaned before applying the silicone finish. A 12-ply laminate with a styrenated polyester laminating resin was found to have a wet strength retention of 84%, while a rod-like laminate made from the sized yarn after storage of the latter for 4 weeks was clear and had a wet strength retention of 90.4% (amount of dry strength retained after immersion in boiling water for four hours). Both the yarn and the cloth were easily wetted by polyester laminating resins of many types.

Examples 2 to 13

Sizing compositions were formulated using materials as follows:

Material: Percent/wt.
- Vinyl silanol _____ 0.25 to 5
- RL-185a _____ 0 to 0.25
- Polyvinyl acetate [1] _____ 0 to 7

[1] Swift's 1482/FG Adhesive—an aqueous polyvinyl acetate emulsion containing about 50% total solids of which about 3% was dibutyl phthalate.

The compositions were prepared by a procedure, identical except for adjustment in the amounts of ingredients, in which 36 liters or 1628 grams of a 50% polyvinyl acetate emulsion were added to 29 liters of water. To this diluted binder emulsion there was then added 30 grams of RL-185a diluted with 150 grams of water. Three hundred and ninety grams of a sodium vinyl siliconate solution (45% concentration) was added to 6 liters of water. This latter solution was then passed downward through a column five feet tall and six inches in diameter packed with approximately 25 lbs. of a cation exchange resin known as IR 120. The deionized solution was collected and added to the binder mix after which the mixture was stirred for 10 minutes. The composition of the resulting sizing composition was 4.55% polyvinyl acetate, 0.083% RL-185a, and 0.05 vinyl silanol.

The sizing compositions, as above described, were applied at the bushing using either a pad or roller applicator. All of the glass rovings were excellently bound together without sticking in the roving cones. After winding on cones the rovings were dried in a forced-air oven at temperatures varying from 150 to 225° F. for periods ranging from 8 to 120 hours. Periodically the roving was quantitatively tested for strand integrity by a hand jerk test and also for choppability. Continuous lengths of rovings were molded into rod-like fishing rod blanks using a polyester resin known as Plaskon 911-11 and tested for dry and wet (after 4 hours boil in water) flexural strengths in order to determine the percent wet strength retention. The results are summarized as follows:

| Ex. No. | Composition of Sizing Solution | | | pH | Drying Time, Hrs. | Roving Char. | Jerk | Chop. | Ave. Percent Wet Strength Retention |
|---|---|---|---|---|---|---|---|---|---|
| | Polyvinyl Acetate | RL-185a | Silanol | | | | | | |
| 2 | 0 | 0 | 1.0 | 4-5 | 8 @ 225° F | Poor | Poor | Poor | 90 |
| 3 | 4.55 | 0 | 1.0 | 5-6 | 8 @ 150° F | | Fair | | 76 |
| 4 | 4.55 | 0 | 5.0 | 6-7 | 16 @ 150° F | Sl. Fuzz and Fly. | | | 71 |
| 5 | 4.55 | 0.25 | 0.5 | 7 | 120 @ 180° F | Good | Good | Good | 75 |
| 6 | 4.55 | 0.25 | 1.0 | 6.8-7.0 | 48 @ 180° F | Soft | Fair | do | 95 |
| 7 | 4.55 | 0.25 | 1.5 | 6.8-7.0 | 48 @ 180° F | Good | | | 84 |
| 8 | 4.55 | 0.083 | 0.5 | 5.2-5.6 | 48 @ 180° F | do | Good | Good | 84 |
| 9 | 4.55 | 0.041 | 0.25 | 5-6 | 12 @ 215° F | do | do | do | 85 |
| 10 | 7.0 | 0.25 | 1.5 | 5-6 | 14 @ 180° F | Sl. Fuzz | | | |
| 11 | 7.0 | | 3.0 | 5-6 | 86 @ 180° F | do | Fair | | 72 |
| 12 | 1.0 | | 2.0 | 5-6 | 8 @ 150° F | | do | | 80 |
| 13 | 2.0 | | 3.0 | 5-6 | 8 @ 150° F | | do | | 80 |

By comparison, a roving treated in a similar manner with a well-known methacrylato-chromic chloride complex size shows a wet strength retention after a 4 hours boil of between only 30 to 40%. Rovings numbers 8, 10 and 12, above show no loss of wet-strength retention on storage for periods ranging from 6 weeks to several months or more. Some of the above treated fibers, for example No. 6, are sufficiently soft and pliable to be woven into fabric.

Although the stable aqueous vinylsilanol dispersion or solution produced in accordance with the method disclosed in the above Santelli application Serial No. 279,470 is presently preferred in production as a component of the herein described size, it may at times be found desirable to substitute therefor a silanol solution prepared by treating a neutralized siliconate solution either successively or simultaneously with anionic or cationic exchange resins. Neutralized siliconate solutions suitable for use in the latter procedure are disclosed in the copending applications of Thomas R. Santelli, Serial No. 279,695, filed March 31, 1952, and Serial No. 279,690, filed April 1, 1952, now abandoned, and also assigned to the assignee of the present application.

There is thus disclosed herein a sizing composition by means of which the fibrous strands possess the proper degree of high abrasion resistance, integrity, pliability and lubricity. And by a proper balance of the disclosed ingredients, which permits the accomplishment of the stated characteristics, the fibers may be processed through the twisting, plying, winding, weaving, drying or cutting operations with no undesirable effects resulting thereto.

Yet at the same time, by the present composition, good adhesion is promoted between the glass fibers and the laminating plastic, which is at least equal to, if not better than, the adhesion resulting from the use of the organosilicone only as a finish on fabricated forms of glass fibers, such as woven fabrics.

It is thus apparent that there has been eliminated the time-consuming, expensive, and upon occasion, the unsatisfactory procedures of first lubricating and binding the fibers during formation, removing this material, and applying a surface treatment in a manner sometimes accompanied by an additional washing or cleaning operation. There has also been eliminated the necessity of certain "after-treatments" which were applied over the conventional lubricants and/or binder to impart desired properties to the fibers for certain subsequent uses, as in electrical insulative applications. For such a purpose it may be found desirable to employ, in place of the unsaturated vinyl silanol of any of the aforementioned Santelli applications, a silanol derived by any of the described procedures from trifunctional saturated hydrocarbon silanes, such as, methyl, ethyl, butyl, phenyl, or mixtures thereof. A silanol of this type is tightly adherent to the glass and serves to effectively modify the surface characteristics thereof. Glass so modified has sufficient affinity for the saturated resins, such as polyvinyl chloride and the like.

Such additional operations are herein rendered generally unnecessary since the present size comprises ingredients which impart to the fibers those characteristics required in substantially every application. The coated fibers may be run through all the normal processing operations such as twisting, weaving, etc., and may then be used to reinforce plastics, paper and other materials, may be used in electrical applications, and for such other end uses as are well-known in the art. In short, there is herein disclosed a "universal size."

It is to be understood that various modifications may be made in the compositions and procedures herein disclosed without departing from the spirit and scope of the invention as defined in the appended claims.

We claim:

1. A sizing composition for application to glass fibers during the formation thereof to improve the adhesion thereto of resinous materials, comprising an aqueous emulsion of a synthetic resinous film-forming agent formed from ethylenically unsaturated monomers, a glass fiber lubricating agent, and a deionized hydrolysis product of a vinyl silanol containing between 1 and 3 hydrolyzable groups and having a non-hydrolyzable group to silicon atom ratio between 0.8 and 1.5 prepared by the cationic deionization of a vinyl siliconate selected from the class consisting of alkali metal vinyl siliconates and alkaline earth metal vinyl siliconates by contact with a hydrogen form of a cation active exchanger.

2. A sizing composition of the character defined in claim 1 in which the glass fiber lubricating agent is selected from the class consisting of monobasic fatty acid amides and dibasic fatty acid amides solubilized with low molecular weight carboxylic acids and mixtures of said solubilized amides.

3. A sizing composition for application to glass fibers during the formation thereof to improve the adhesion thereto of resinous materials comprising the following, percentages being by weight, from 0.5 to 7.0% of an aqueous emulsion of a synthetic resinous film-forming agent formed from ethylenically unsaturated monomers, from 0.01 to 1.2% of a glass fiber lubricating agent and from 0.05 to 5% of a deionized hydrolysis product of a vinyl silane containing between 1 and 3 hydrolyzable groups and having a non-hydrolyzable organo group to silicon atom ratio between 0.8 and 1.5, having a pH of from 3 to 8 prepared by cationic deionization of a vinyl siliconate selected from the class consisting of alkali metal vinyl siliconates and alkaline earth metal vinyl siliconates prepared by contact with the hydrogen form of a cation active exchanger.

4. A sizing composition of the character defined in claim 3 in which the lubricating agent comprises 0.01 to 0.50% of an amide selected from the class consisting of monobasic fatty acid amides and dibasic fatty acid amides, which amide has been solubilized with a low molecular weight carboxylic acid and mixtures thereof.

5. A stable aqueous emulsion sizing composition suitable for application to glass fibers during the formation thereof to improve the adhesion thereto of resinous materials comprising an aqueous emulsion of polyvinyl acetate, a glass fiber lubricating aliphatic carboxylic acid amide of polyethylene polyamine and a deionized hydrolysis product of vinyl silane containing between 1 and 3 hydrolyzable groups and having a non-hydrolyzable organo group to silicon atom ratio between 0.8 and 1.5 prepared by the catonic deionization of a vinyl siliconate selected from the class consisting of alkali metal and alkaline earth metal vinyl siliconates by contact with a hydrogen form of a cation active exchanger.

6. A stable aqueous emulsion sizing composition suitable for application to glass fibers during formation thereof to improve the adhesion thereto of resinous materials comprising from 0.5 to 7.0% of an aqueous emulsion of polyvinyl acetate, from 0.01 to 1.2% of a glass fiber lubricating amide of a $C_8$ to $C_{18}$ aliphatic carboxylic acid and tetraethylene pentamine and a deionized hydrolysis product of a vinyl silane containing between 1 and 3 hydrolyzable groups and having a nonhydrolyzable organo group to silicon atom ratio between 0.8 and 1.5 prepared by the cationic deionization of a vinyl siliconate selected from the class consisting of alkali metal vinyl siliconates and alkaline earth metal vinyl siliconates by contact with the hydrogen form of a cation active exchanger.

7. Glass fibers coated with the composition of claim 1.

References Cited in the file of this patent

UNITED STATES PATENTS

| 2,441,423 | Elliott et al. | May 11, 1943 |
| 2,604,688 | Slayter | July 29, 1952 |
| 2,688,007 | Steinman | Aug. 31, 1954 |

OTHER REFERENCES

Rochow: "Chemistry of the Silicons," 2nd Edition, page 54 (1951), John Wiley & Sons, New York City.